(12) United States Patent
Choi et al.

(10) Patent No.: US 10,613,260 B2
(45) Date of Patent: Apr. 7, 2020

(54) WINDOW FILM FOR DISPLAY AND DISPLAY DEVICE INCLUDING SAME

(71) Applicant: SAMSUNG SDI CO., LTD., Yongin-si, Gyeonggi-do (KR)

(72) Inventors: Jin Hee Choi, Suwon-si (KR); Kyoung Ku Kang, Suwon-si (KR); Si Kyun Park, Suwon-si (KR); Joo Hui Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 9 days.

(21) Appl. No.: 15/525,568

(22) PCT Filed: Nov. 10, 2015

(86) PCT No.: PCT/KR2015/012085
§ 371 (c)(1),
(2) Date: May 9, 2017

(87) PCT Pub. No.: WO2016/076616
PCT Pub. Date: May 19, 2016

(65) Prior Publication Data
US 2017/0322354 A1 Nov. 9, 2017

(30) Foreign Application Priority Data
Nov. 11, 2014 (KR) .................... 10-2014-0156436

(51) Int. Cl.
*C09J 7/38* (2018.01)
*C09J 133/06* (2006.01)
(Continued)

(52) U.S. Cl.
CPC ............... *G02B 5/208* (2013.01); *C08K 5/27* (2013.01); *C09D 183/06* (2013.01); *C09J 7/385* (2018.01);
(Continued)

(58) Field of Classification Search
None
See application file for complete search history.

(56) References Cited

U.S. PATENT DOCUMENTS 6,114,446 A * 9/2000 Narisawa ................. C08F 8/30
428/421
2003/0235704 A1 12/2003 Akatsu et al.
(Continued)

FOREIGN PATENT DOCUMENTS

CN 1863672 A 11/2006
CN 102576094 A 7/2012
(Continued)

OTHER PUBLICATIONS

Tinuvin UV Absorbers data sheet (Year: 2018).*
(Continued)

*Primary Examiner* — Frank D Ducheneaux
(74) *Attorney, Agent, or Firm* — Lewis Roca Rothgerber Christie LLP

(57) ABSTRACT

Provided are a window film for a display and a display device including the same, and the window film for a display comprises: a substrate layer; a coating layer formed on one side of the substrate layer; and an adhesive layer formed on the other side of the substrate layer, wherein the coating layer and/or the adhesive layer includes, relative to each layer, a UV absorbent of approximately 3 wt % to approximately 20 wt %, and the window film for a display has a transmittance of approximately 1% or less for a wavelength of 390 nm or less.

13 Claims, 2 Drawing Sheets

(51) Int. Cl.
| | |
|---|---|
| *C09J 133/04* | (2006.01) |
| *C08K 5/27* | (2006.01) |
| *C08K 5/3475* | (2006.01) |
| *C08K 5/3492* | (2006.01) |
| *C09D 183/06* | (2006.01) |
| *G02B 5/20* | (2006.01) |
| *C08K 5/00* | (2006.01) |

(52) U.S. Cl.
CPC ....... *B32B 2255/26* (2013.01); *B32B 2457/20* (2013.01); *C08K 5/005* (2013.01); *C08K 5/3475* (2013.01); *C08K 5/3492* (2013.01); *C09J 133/04* (2013.01); *C09J 133/066* (2013.01); *C09J 2201/122* (2013.01); *C09J 2201/622* (2013.01); *C09J 2203/318* (2013.01); *C09J 2205/102* (2013.01); *C09J 2433/00* (2013.01); *C09J 2467/006* (2013.01); *C09J 2483/001* (2013.01)

(56) References Cited

U.S. PATENT DOCUMENTS

| | | | | |
|---|---|---|---|---|
| 2005/0277729 | A1* | 12/2005 | Tsunemine | C09J 11/06 524/558 |
| 2007/0048531 | A1 | 3/2007 | Nagaoka et al. | |
| 2008/0100780 | A1* | 5/2008 | Suzuki | G02B 1/105 349/96 |
| 2010/0196655 | A1* | 8/2010 | Kai | G02B 1/11 428/110 |
| 2012/0229893 | A1* | 9/2012 | Hebrink | G02B 1/04 359/359 |
| 2012/0243115 | A1* | 9/2012 | Takamiya | B29D 11/0073 359/894 |
| 2013/0085215 | A1* | 4/2013 | Shitara | C09J 7/00 524/100 |
| 2015/0004397 | A1* | 1/2015 | Horio | G02B 1/105 428/328 |
| 2015/0022878 | A1 | 1/2015 | Youn et al. | |

FOREIGN PATENT DOCUMENTS

| | | |
|---|---|---|
| CN | 103031071 A | 4/2013 |
| EP | 1 371 682 A2 | 12/2003 |
| JP | 2007-144824 A | 6/2007 |
| JP | 2012-137546 A | 7/2012 |
| KR | 10-2006-0134918 A | 12/2006 |
| KR | 10-0992515 B1 | 11/2010 |
| KR | 10-2014-0104334 A | 8/2014 |
| KR | 10-2014-0104820 A | 8/2014 |
| TW | 200907402 A | 2/2009 |

OTHER PUBLICATIONS

3M Optically Clear Adhesives 8171 and 8172 data sheet (Year: 2018).*
International Search Report for corresponding PCT Application No. PCT/KR2015/012085, dated Feb. 17, 2016 (5 pages).
Written Opinion for corresponding PCT Application No. PCT/KR2015/012085, dated Feb. 17, 2016 (5 pages).
Office Action issued in corresponding Korean Patent Application No. 10-2015-0157747, Office action dated Jan. 22, 2018 (5 pgs.).
Office Action from corresponding China Patent Application No. 201580060776.5, China Office action dated Aug. 16, 2019 (7 pgs.).

* cited by examiner

【FIG. 1】
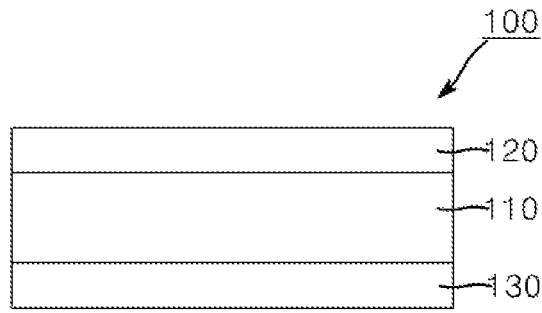
【FIG. 2】
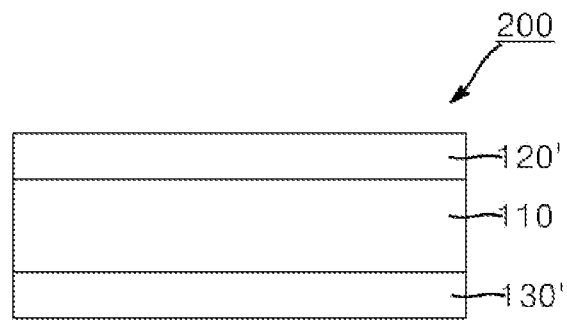
【FIG. 3】
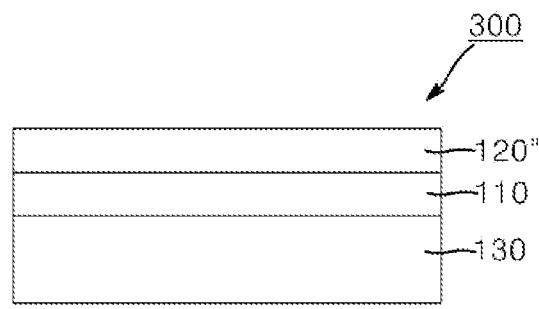
【FIG. 4】
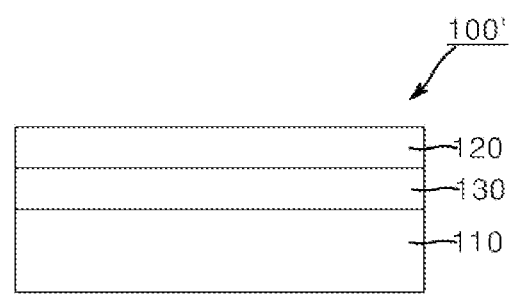

[FIG. 5]
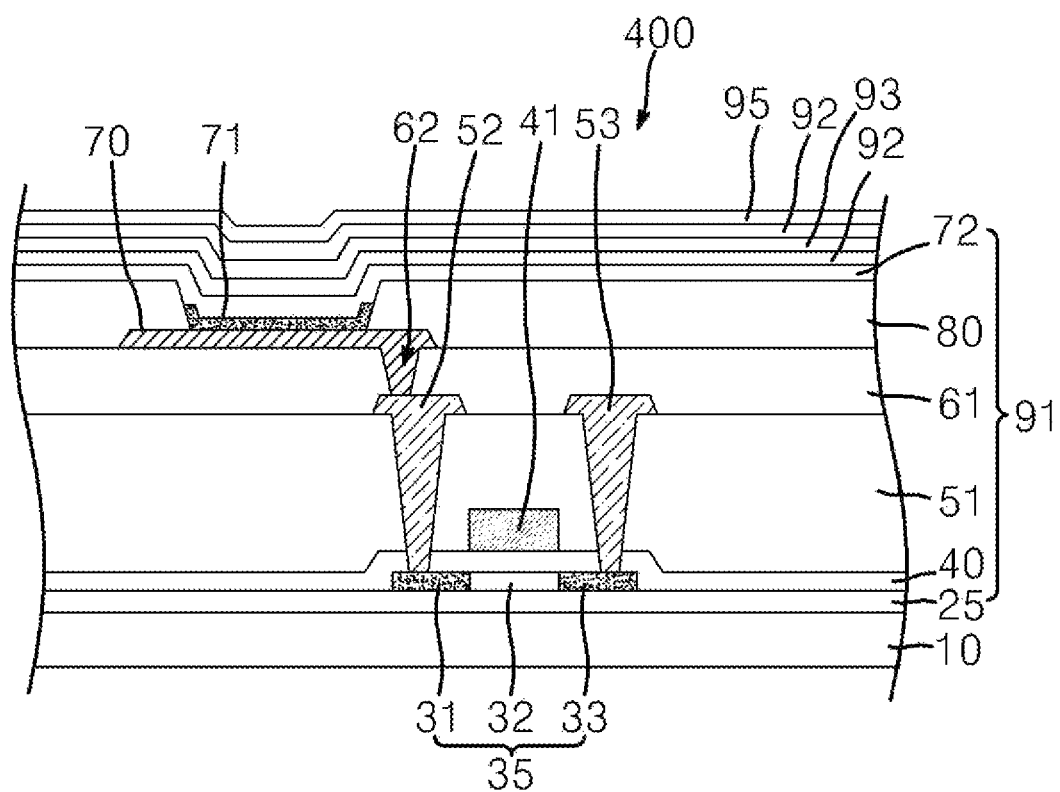

WINDOW FILM FOR DISPLAY AND DISPLAY DEVICE INCLUDING SAME

CROSS-REFERENCE TO RELATED APPLICATIONS

This application is a National Phase patent application and claims priority to and the benefit of International Application Number PCT/KR2015/012085, filed on Nov. 10, 2015, which claims priority to and the benefit of Korean Application No. 10-2014-0156436, filed on Nov. 11, 2014, the entire contents of each of which are incorporated herein by reference.

BACKGROUND

1. Field

The present invention relates to a window film for displays and a display including the same.

2. Description of the Related Art

A transparent display means a display having high transmittance and allowing a rear side thereof to be viewed. Recently, the transparent display is applied not only to a flat display but also to a flexible display that can be folded and unfolded. The transparent display may employ OLEDs, LCDs, TFELs (thin film electroluminescent displays), and the like.

Transparent displays are used in fields such as outdoor advertising. A light emitting device such as an OLED, particularly, blue light emitting materials, can be damaged due to long-term exposure to UV light, thereby causing discoloration and reduction in lifespan. Moreover, although a conventional optical display includes a UV absorbent incorporated into a polarizing plate to provide a UV absorption function, a transparent display cannot use such a polarizing plate and thus UV light of short wavelengths absorbed by a typical polarizing plate can reach the light emitting device.

SUMMARY

It is one aspect of the present invention to provide a window film for displays that has a low transmittance with respect to light having a wavelength of 390 nm or less, thereby minimizing damage, discoloration or reduction in lifespan of display devices.

It is another aspect of the present invention to provide a window film for displays that may block light having a wavelength of 390 nm or less when including a UV absorbent and may prevent precipitation of the UV absorbent.

It is a further aspect of the present invention to provide a window film for displays applicable to a transparent display, particularly a transparent OLED display.

In accordance with one aspect of the present invention, a window film for displays includes: a base layer; a coating layer formed on one surface of the base layer; and an adhesive layer formed on the other surface of the base layer, wherein at least one of the base layer, the coating layer and the adhesive layer comprises about 3% by weight (wt %) to about 20 wt % of a UV absorbent in each layer, and the window film has a transmittance of about 1% or less at a wavelength of 390 nm or less.

In accordance with another aspect of the present invention, a display includes the window film for displays set forth above.

The present invention provides a window film for displays that has a low transmittance with respect to light having a wavelength of 390 nm or less, thereby minimizing damage, discoloration or reduction in lifespan of a display device.

The present invention provides a window film for displays that may block light having a wavelength of 390 nm or less when including a UV absorbent and may prevent precipitation of the UV absorbent.

The present invention provides a window film for displays applicable to a transparent display, particularly a transparent OLED display.

BRIEF DESCRIPTION OF DRAWINGS

FIG. 1 is a sectional view of a window film for displays according to one embodiment of the present invention.

FIG. 2 is a sectional view of a window film for displays according to another embodiment of the present invention.

FIG. 3 is a sectional view of a window film for displays according to a further embodiment of the present invention.

FIG. 4 is a sectional view of a window film for displays according to yet another embodiment of the present invention.

FIG. 5 is a sectional view of a display according to one embodiment of the present invention.

DETAILED DESCRIPTION

Embodiments of the present invention will be described in detail with reference to the accompanying drawings. It should be understood that the present invention is not limited to the following embodiments and may be embodied in different ways. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface". In addition, when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, the term "(meth)acryl" refers to "acryl" and/or "methacryl".

Herein, the term "solid content" means the remaining amount of a composition excluding the amount of a solvent.

Hereinafter, a window film for displays according to one embodiment of the present invention will be described with reference to FIG. 1. FIG. 1 is a sectional view of a window film for displays according to one embodiment of the present invention.

Referring to FIG. 1, a window film 100 according to one embodiment of the present invention includes a base layer 110, a coating layer 120, and an adhesive layer 130.

The base layer 110 supports the window film 100 and may be formed of an optically transparent material. Specifically, the base layer may be formed of a glass substrate or an optically transparent flexible resin. More specifically, the base layer may include at least one of polyester resins including polyethylene terephthalate (PET), polyethylene naphthalate (PEN), polybutylene terephthalate, and polybutylene naphthalate, polycarbonate (PC) resins, polyimide (PI) resins, polystyrene resins, polyether sulfone (PES) resins, poly(meth)acrylate resins including poly(methyl methacrylate), silicone resins, and the like. The base layer 110 may further include a reinforcing material such as glass fibers to increase strength thereof.

The base layer 110 may have a thickness of about 10 μm to about 200 μm. Within this range, the base layer 110 may be used in a window film for displays. Specifically, the base layer may have a thickness of about 30 μm to about 100 μm.

The coating layer 120 is formed on one surface of the base layer 110 to protect the window film 100 from external impact.

The coating layer 120 may be formed of a composition for coating layers including a resin having at least one crosslinkable functional group and an initiator.

The resin having at least one crosslinkable functional group constitutes a crosslinking structure to form a matrix of the coating layer 120 while improving hardness of the coating layer 120. The "crosslinkable functional group" is cured by heat or light and may include a (meth)acrylate group, an epoxy group including an alicyclic epoxy group or a glycidyl group, a vinyl group, a (meth)acrylamide group, or an aryl group. For example, the resin having a crosslinkable functional group may include a silicone resin having the crosslinkable functional group. These may be used alone or as a mixture thereof.

The silicone resin having the crosslinkable functional group may be a siloxane resin having the crosslinkable functional group. Specifically, the siloxane resin having the crosslinkable functional group may be prepared through hydrolysis and condensation of an alkoxysilane having the crosslinkable functional group alone or a mixture of an alkoxy silane having the crosslinkable functional group and a different alkoxy silane free from the crosslinkable functional group, without being limited thereto.

The alkoxysilane having the crosslinkable functional group may be represented by Formula 1. The alkoxysilane free from the crosslinkable functional group may be represented by Formula 2. These may be used alone or as a mixture thereof. However, it should be understood that the present invention is not limited thereto:

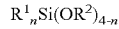  <Formula 1>

(wherein $R^1$ is a crosslinkable functional group, or a linear or branched $C_1$ to $C_6$ alkyl group containing a crosslinkable functional group, the crosslinkable functional group including a (meth)acrylate group, an alicyclic epoxy group, a glycidyl group, a vinyl group, a (meth)acrylamide group, or an aryl group; $R^2$ is a linear or branched $C_1$ to $C_7$ alkyl group; and n is an integer of 1 to 3).

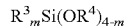  <Formula 2>

(wherein $R^3$ is an unsubstituted $C_1$ to $C_{20}$ alkyl group, a $C_3$ to $C_8$ cycloalkyl group, a $C_2$ to $C_{20}$ alkenyl group, a $C_2$ to $C_{20}$ alkynyl group, a $C_6$ to $C_{20}$ aryl group, a halogen, an amino group, a mercapto group, an ether group, an ester group, a carbonyl group, a carboxyl group, a nitro group, a sulfone group, an alkyd group, a carboxylate group, a $C_1$ to $C_{20}$ alkyl group having a halogen, or a $C_1$ to $C_{20}$ alkyl group having an amino group; $R_4$ is a $C_1$ to $C_7$ alkyl group; and m is an integer of 0 to 3).

Examples of the alkoxysilane represented by Formula 1 may include 2-(3,4-epoxycyclohexyl)ethyltrimethoxysilane, 2-(3,4-epoxycyclohexyl)ethyltriethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, and 3-(meth)acryloxypropyltripropoxysilane, without being limited thereto.

Examples of the alkoxysilane represented by Formula 2 may include tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, phenyltriethoxysilane, diphenyldimethoxysilane, diphenyldiethoxysilane, triphenylmethoxysilane, triphenylethoxysilane, ethyltriethoxysilane, propylethyltrimethoxysilane, N-(aminoethyl-3-aminopropyl)trimethoxysilane, N-(2-aminoethyl-3-aminopropyl)triethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane, without being limited thereto.

In some embodiments, the siloxane resin having the crosslinkable functional group may include at least one of polysilsesquioxane having an alicyclic epoxy group, a siloxane resin having an alicyclic epoxy group, or a cage type polysilsesquioxane having a (meth)acrylate group.

Hydrolysis and condensation are typically known to those skilled in the art. Specifically, hydrolysis and condensation may be performed by mixing organosilane having a crosslinkable functional group and an alkoxysilane group with a solvent and reaction rate for hydrolysis and condensation may be controlled by further adding a catalyst. The catalyst may include acid catalysts such as hydrochloric acid, acetic acid, hydrogen fluoride, nitric acid, sulfuric acid, chlorosulfonic acid, and iodic acid; base catalyst such as ammonia, potassium hydroxide, sodium hydroxide, barium hydroxide, and imidazole; ion exchange resins such as Amberite IRA-400, IRA-67, and the like. Hydrolysis and condensation may be performed for about 12 hours to about 7 days at room temperature, and may be performed for about 2 hours to about 72 hours at about 60° C. to about 100° C. for acceleration of reaction, without being limited thereto. The solvent for hydrolysis and condensation is not particularly limited. Specifically, the solvent may include at least one selected from the group consisting of water, methanol, ethanol, propanol, isopropanol, n-butanol, t-butanol, methoxypropanol, and combinations thereof.

The initiator serves to cure the crosslinkable functional group of the silicone resin and may include at least one selected from among a photocationic initiator, a photoradical initiator, and a mixture thereof. The photocationic initiator may be any typical photocationic initiator known to those skilled in the art. Specifically, the photocationic initiator may be an onium salt containing a cation and an anion. Examples of cations may include diaryliodonium such as diphenyliodonium, 4-methoxydiphenyliodonium, bis(4-methylphenyl)iodonium, bis(4-tert-butylphenyl)iodonium, and bis(dodecylphenyl)iodonium; triarylsulfonium such as triphenylsulfonium, diphenyl-4-thiophenoxyphenylsulfonium, and (4-tert-butylphenyl)diphenylsulfonium; and bis[4-(diphenylsulfonio)phenyl]sulfide). Examples of anions may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), and triflate ($CF_3SO_3^-$). The photoradical initiator may be any typical photoradical initiator known to those skilled in the art. For example, the photoradical initiator may include at least one of thioxanthone, phosphorus, triazine, acetophenone, benzophenone, benzoin, and oxime photoradical initiators.

The initiator may be present in an amount of about 0.1 parts by weight to about 10 parts by weight, specifically about 0.5 parts by weight to about 5 parts by weight, more specifically about 1 part by weight to about 3 parts by weight, relative to 100 parts by weight of the silicone resin in terms of solid content. Within this range, the initiator may secure suitable initiation of curing, suitable curing rate, and suitable curing degree, thereby providing high hardness.

The composition for coating layers may further include a crosslinkable monomer.

The crosslinkable monomer may be cured together with the silicone resin to improve hardness of the coating layer. The crosslinkable monomer may include a monomer having at least one of a (meth)acrylate group, an epoxy group such as an alicyclic epoxy group and a glycidyl group, and an oxetane group. The crosslinkable monomer may be present in an amount of about 0.1 parts by weight to about 40 parts by weight relative to 100 parts by weight of the silicone resin in terms of solid content. Within this range, the crosslinkable monomer may realize high hardness of the coating layer while securing flexibility thereof.

The coating layer 120 has a thickness of about 1 μm to about 100 μm. Within this thickness range, the coating layer may be used in the window film for displays. Specifically, the coating layer 120 may have a thickness of about 20 μm to about 60 μm. The coating layer 120 may have a pencil hardness of about 6H or higher, more specifically about 7H to about 10H. Within this hardness range, the coating layer may be used in the window film for displays, thereby protecting a display device from an external environment.

The adhesive layer 130 is formed on the other surface of the base layer 110 to adhere the window film 100 to a display device (not shown in FIG. 1), and may include a UV absorbent. As the adhesive layer 130 includes the UV absorbent, it is possible to enhance external light stability of a display device, to which the window film according to this embodiment is applied, by absorbing and blocking not only light having a wavelength of about 390 nm or less, specifically about 380 nm or less, but also light having a wavelength of about 380 nm to about 390 nm.

The window film 100 according to this embodiment may have a transmittance of about 1% or less not only at a wavelength of about 380 nm or less, but also at a wavelength of about 390 nm or less. Within this range, the window film may enhance external light stability of various display devices such as organic light emitting devices formed under the window film. In particular, when used in a transparent OLED display, the window film may sufficiently prevent damage to a blue light emitting material due to external light. Specifically, the window film for displays may have a transmittance of about 0.001% to about 1%.

In the adhesive layer 130, the UV absorbent may be present in an amount of about 3 wt % to about 20 wt %, for example, about 3.5 wt % to about 15 wt %, about 4 wt % to about 15 wt %, or about 5 wt % to about 10 wt %. Within this range, the UV absorbent may improve external light stability of a display to which the window film according to this embodiment is applied and may be prevented from being precipitated as white spots due to an excess of the UV absorbent.

The adhesive layer 130 may be formed of a composition for adhesive layers, such as a pressure sensitive adhesive (PSA) including a UV absorbent and an OCA (optically clear adhesive) including a UV absorbent. Specifically, the adhesive layer 130 may be formed of a composition for adhesive layers including a (meth)acrylic adhesive resin, a curing agent, and a UV absorbent.

The (meth)acrylic adhesive resin may be formed of a monomer mixture including at least one of an alkyl group-containing (meth)acrylic monomer, a hydroxyl group-containing a (meth)acrylic monomer, an alicyclic group-containing (meth)acrylic monomer, a hetero-alicyclic group-containing (meth)acrylic monomer, and a carboxylate group-containing (meth)acrylic monomer.

The alkyl group-containing (meth)acrylic monomer may include a unsubstituted $C_1$ to $C_{10}$ alkyl group-containing (meth)acrylic ester. The hydroxyl group-containing (meth)acrylic monomer may include a $C_1$ to $C_{10}$ alkyl group-containing (meth)acrylic ester having at least one hydroxyl group. The alicyclic group-containing (meth)acrylic monomer may include a $C_3$ to $C_{10}$ alicyclic group-containing (meth)acrylic ester. The hetero-alicyclic group-containing (meth)acrylic ester may include a $C_3$ to $C_{10}$ hetero-alicyclic group-containing (meth)acrylic ester containing at least one of nitrogen, oxygen or sulfur. The carboxylate group-containing (meth)acrylic monomer may include (meth)acrylic acid. The (meth)acrylic adhesive resin may be present in an amount of about 80 wt % or more, for example, about 90 wt % or more, in the composition for adhesive layers in terms of solid content. Within this range, the (meth)acrylic adhesive resin may secure suitable optical properties in terms of transmittance, color, and the like, and may exhibit suitable adhesion.

The curing agent may include at least one of an isocyanate curing agent, an epoxy curing agent, an imide curing agent, and a metal chelate curing agent. These curing agents may be used alone or in combination thereof. The curing agent may be present in an amount of about 0.1 wt % to about 1.5 wt % in the composition for adhesive layers in terms of solid content. Within this range, the composition for adhesive layers may secure adhesive strength and suitable modulus of the adhesive.

The UV absorbent may be a UV absorbent having an absorbance of about 0.25 AU or more, specifically about 0.30 AU to about 1.0 AU, at a wavelength of 380 nm in 20 mg/L of toluene (path 1 cm). Alternatively, the UV absorbent may be a UV absorbent having an absorbance of about 0.05 AU or more, specifically 0.1 AU or more, at a wavelength of 390 nm in 20 mg/L of toluene (path 1 cm). In addition, the UV absorbent may be a UV absorbent having a maximum absorption wavelength ($A_{max}$) of greater than about 350 nm, specifically greater than about 350 nm to about 390 nm. Within this range, the UV absorbent may reduce transmittance by sufficiently absorbing external light having a wavelength of 390 nm or less, for example, 380 nm to 390 nm, thereby improving external light stability of a display device. Specifically, the UV absorbent may be a benzotriazole or triazine UV absorbent, more specifically at least one of Tinuvin 477™ and Tinuvin 326™. As used herein, "maximum absorption wavelength" means a wavelength at a maximum absorption peak, that is, a wavelength indicating a maximum absorbance in an absorbance curve depending upon wavelength. Here, "absorbance" may be measured by a typical method known to those skilled in the art.

The UV absorbent may be present in an amount of about 3 wt % to about 20 wt % in the composition for adhesive layers in terms of solid content. Within this range, the UV absorbent may improve external stability by securing a transmittance of 1% or less at a wavelength of 390 nm or less, for example, 380 nm to 390 nm, and may prevented from being precipitated as white spots due to an excess of the UV absorbent.

The composition for adhesive layers may further include a silane coupling agent. The silane coupling agent may improve properties of the adhesive layer such as modulus by improving the crosslinking degree of the adhesive layer.

As the silane coupling agent, any typical silane coupling agent known in the art may be used. For example, the silane coupling agent may include at least one selected from the group consisting of epoxy structure-containing silicon compounds such as 3-glycidoxypropyltrimethoxysilane, 3-glycidoxypropylmethyldimethoxysilane, and 2-(3,4-epoxycyclohexyl)ethyltrimethoxysilane; polymerizable unsaturated group-containing silicon compounds such as vinyltrimethoxysilane, vinyltriethoxysilane, and (meth)acryloxypropyltrimethoxysilane; amino group-containing silicon compounds such as 3-aminopropyltrimethoxysilane, 3-aminopropyltriethoxysilane, N-(2-aminoethyl)-3-aminopropyltrimethoxysilane, and N-(2-aminoethyl)-3-aminopropylmethyldimethoxysilane; and 3-chloropropyltrimethoxysilane, without being limited thereto. The silane coupling agent may be present in an amount of about 0.1 wt % to about 5 wt %, specifically about 0.1 wt % to about 1 wt %, in the composition for adhesive layers in terms of solid content. Within this content range of the silane coupling agent, the window film may secure suitable modulus.

The adhesive layer 130 may have a thickness of about 1 μm to about 50 μm. Within this range, the adhesive layer may be used in the window film for displays. Specifically, the adhesive layer 130 may have a thickness of about 10 μm to about 30 μm.

Although not shown in FIG. 1, the coating layer 120 may further include the UV absorbent described above. In the coating layer 120, the UV absorbent may be present in an amount of about 3 wt % to about 20 wt %, for example, about 3.5 wt % to about 15 wt %, about 4 wt % to about 15 wt %, or about 5 wt % to about 10 wt %.

Next, a window film for displays according to another embodiment of the present invention will be described with reference to FIG. 2. FIG. 2 is a sectional view of a window film for displays according to another embodiment of the present invention.

Referring to FIG. 2, a window film 200 according to another embodiment includes a base layer 110, a coating layer 120', and an adhesive layer 130'. The window film according to this embodiment is substantially the same as the window film according to the above embodiment except that the UV absorbent is included in the coating layer instead of the adhesive layer.

The coating layer 120' may be formed of a composition for coating layers including the aforementioned resin for coating layers and the UV absorbent. The UV absorbent may be present in an amount of about 3 wt % to about 20 wt %, for example, about 3.5 wt % to about 15 wt %, about 4 wt % to about 15 wt %, or about 5 wt % to about 10 wt % in the composition for coating layers in terms of solid content. Within this range of the UV absorbent, the window film may secure a transmittance of 1% or less at a wavelength of 390 nm or less, for example, 380 nm to 390 nm.

Next, a window film for displays according to a further embodiment of the present invention will be described with reference to FIG. 3. FIG. 3 is a sectional view of a window film for displays according to a further embodiment of the present invention.

Referring to FIG. 3, a window film 300 according to a further embodiment of the invention includes a base layer 110, a coating layer 120", and an adhesive layer 130. The window film according to this embodiment is substantially the same as the window film according to the above embodiment except that the UV absorbent is included in the adhesive layer 130 and the coating layer 120". That is, the coating layer 120" also includes the UV absorbent.

The coating layer 120" may be formed of a composition for coating layers that includes the resin having at least one crosslinkable functional group described above, an initiator, and a UV absorbent. In the composition for coating layers, the UV absorbent may be present in an amount of about 10 wt % or less, specifically about 5 wt % or less, for example, about 0.1 wt % to about 5 wt %. Within this content range of the UV absorbent, the window film may secure better strength and optical properties of the coating layer than the window film for displays according to the above embodiment in which the UV absorbent is included in the coating layer.

Next, a window film for displays according to yet another embodiment of the present invention will be described with reference to FIG. 4. FIG. 4 is a sectional view of a window film for displays according to yet another embodiment of the present invention.

Referring to FIG. 4, a window film 100' according to yet another embodiment of the invention may include a base layer 110, a coating layer 120, and an adhesive layer 130. The window film 100' according to this embodiment may have a stack structure in which the base layer 110, the adhesive layer 130 and the coating layer 120 are sequentially stacked in the stated order. The window film according to this embodiment is substantially the same as the window film according to the above embodiment except that the adhesive layer 130 is interposed between the base layer 110 and the coating layer 120. As in the above embodiment, the UV absorbent is included in the adhesive layer 130 or the coating layer 120 to absorb long wavelength UV light, that is, light having a wavelength of about 390 nm or less, for example, about 380 nm to 390 nm.

A transparent display according to one embodiment of the present invention may include the film for displays according to the embodiments of the invention. Specifically, the transparent display may be a transparent organic light emitting display including a flexible transparent organic light emitting display, without being limited thereto.

Next, a transparent display according to one embodiment of the present invention will be described with reference to FIG. 5. FIG. 5 is a sectional view of a transparent display according to one embodiment of the present invention.

Referring to FIG. 5, a transparent display 400 according to one embodiment of the invention includes a substrate 10, an organic light emitting display device 91 formed on the substrate 10 and including an organic light emitting layer 71, an adhesive layer 92 formed on the organic light emitting display device 91, a touchscreen panel 93 formed on the adhesive layer 92, an adhesive layer 92 formed on the touchscreen panel 93, and a window film 95 formed on the adhesive layer 92, wherein the window film 95 may include the window film for displays according to the embodiments of the invention. In this embodiment, the window film is formed on the organic light emitting display device. However, the transparent display is not limited to the organic light emitting display device, and may be a liquid crystal display (LCD), a light emitting display (LED), or the like.

The substrate 10 supports the organic light emitting display device 91 and may include a flexible substrate. For example, the substrate 10 may include a silicone substrate, a polyimide substrate, a polycarbonate substrate, and a polyacrylate substrate, without being limited thereto.

The organic light emitting display device 91 includes an organic light emitting layer and emits light. The organic light emitting display device 91 may include a buffer layer 25 formed on the substrate 10, a gate electrode 41 formed on the buffer layer 25, and a gate insulating film 40 formed between the gate electrode 41 and the buffer layers 25. In the gate insulating film 40, an active layer 35 including source and drain regions 31, 32, 33 is formed. An interlayer insulating film 51 having source and drain electrodes 52, 53 is formed on the gate insulating film 40. A passivation layer 61 including a contact hole 62 is formed on the interlayer insulating film 51, and a first electrode 70 and a pixel defining layer 80 are further formed thereon. The organic emission layer 71 and a second electrode 72 are formed on the pixel defining layer 80.

The adhesive layer 92 adheres the touchscreen panel 93 and the organic light emitting display 91 to each other, and may be formed of a pressure sensitive adhesive containing a (meth)acrylate resin, a crosslinking agent, an initiator, and a silane coupling agent.

The touchscreen panel 93 senses an electrical signal generated when touched by a finger or the like and may be formed of a flexible material. Specifically, the touchscreen panel 93 may be formed of a metal nanowire having flexibility and electrical conductivity, and may employ a conductor formed by patterning a conductive film containing an electrically conductive polymer.

A transparent display according to another embodiment of the invention may further include a polarizing plate disposed at an upper or lower side of the touchscreen panel 93 of the transparent display according to the above embodiment of the invention, in which the polarizing plate may be, for example, a polarizing film.

A transparent display according to a further embodiment of the invention may include a display unit, an adhesive layer formed on an upper surface of the display unit, and a window film formed on an upper surface of the adhesive layer, in which the window film may include the window film for displays according to the embodiments of the present invention.

The adhesive layer may be formed of a pressure sensitive adhesive containing a (meth)acrylate resin, a crosslinking agent, an initiator, and a silane coupling agent.

The display unit may be an organic light emitting display device, a liquid crystal display device, a light emitting diode, or the like. For example, a touchscreen panel may be formed in the display unit. A polarizing plate or an encapsulation material may be formed at an uppermost side of the display unit and the encapsulating material may be glass or a plastic film.

Hereinafter, the present invention will be described in more detail with reference to some examples. It should be understood that these examples are provided for illustration only and are not to be construed in any way as limiting the present invention.

Example 1

A composition for adhesive layers was prepared by mixing 81.49 g of a (meth)acrylate resin (CI207, Soken, 30 wt % in terms of solid content), 0.03 g of an isocyanate curing agent (TD75, Soken), 16.3 g of methylethylketone (Daejung Chemical Industry Co., Ltd.) as a diluent, and 2.08 g of a UV absorbent (Tinuvin 326, BASF) (absorbance: 0.35 AU at a wavelength of 380 nm in 20 mg/L of toluene (path 1 cm) and 0.15 AU at a wavelength of 390 nm in 20 mg/L of toluene (path 1 cm), maximum absorption wavelength: 355 nm). Then, the composition for adhesive layers was deposited onto one surface of a polyethylene terephthalate (PET) film (KEL86W, Teijin-Dupon) as a base film, and dried at 80° C. for 3 minutes to form an adhesive layer having a thickness of 25 μm, which in turn was left in an oven under constant temperature/humidity conditions of 30° C. and 75% RH for 48 hours. A film for displays was prepared by attaching the PET film to a lower side of a silicone resin film containing an acrylate group (SILPLUS M130, SILPLUS is a registered trademark of Nippon Steel & Sumikin Chemical Co. Ltd.) as a coating layer via the adhesive layer.

Example 2

A composition for coating layers was prepared by mixing 91.93 g of an alicyclic epoxy functional group-containing silsesquioxane resin (Epoxy Hybrimer, 90 wt % in terms of solid content, Solips), 1.65 g of (4-tert-butylphenyl)diphenylsulfonium triflate (Aldrich) as a photocationic polymerization initiator, and 6.41 g of methylethylketone as a diluent. Then, the composition for coating layers was deposited onto one surface of a polyethylene terephthalate (PET) film (KEL86W, Teijin-Dupon) as a base film, and dried at 80° C. for 3 minutes to form a coating layer having a thickness of 25 μm, which in turn was left in an oven under constant temperature/humidity conditions of 30° C. and 75% RH for 48 hours.

A composition for adhesive layers was prepared by mixing 80.15 g of a (meth)acrylate resin (CI207, Soken, 30 wt % in terms of solid content), 0.03 g of an isocyanate curing agent (TD75, Soken), 0.1 g of a silane coupling agent (A50, Soken), 16.03 g of methylethylketone (Daejung Chemical Industry Co., Ltd.) as a diluent, and 3.69 g of a UV absorbent (Tinuvin 477, BASF) (absorbance: 0.4 AU at a wavelength of 380 nm in 20 mg/L of toluene (path 1 cm) and 0.1 AU at a wavelength of 390 nm in 20 mg/L of toluene (path 1 cm), maximum absorption wavelength: 360 nm). Then, the composition for adhesive layers was deposited onto one surface of a polyethylene terephthalate (PET) release film (KEL86W, Teijin-Dupon), and dried at 80° C. for 3 minutes to form an adhesive layer having a thickness of 25 μm, which in turn was left in an oven under constant temperature/humidity conditions of 30° C. and 75% RH for 48 hours. A film for displays was prepared by attaching the adhesive layer to the other surface of the PET film having the coating layer formed thereon.

Example 3

A composition for coating layers was prepared by mixing 88.16 g of an alicyclic epoxy functional group-containing silsesquioxane resin (Epoxy Hybrimer, 90 wt % in terms of solid content, Solips), 1.59 g of (4-tert-butylphenyl)diphenylsulfonium triflate (Aldrich) as a photocationic polymerization initiator, 6.15 g of methylethylketone as a diluent, and 4.10 g of a UV absorbent (Tinuvin 326). Then, the composition for coating layers was deposited onto one surface of a polyethylene terephthalate (PET) film (KEL86W, Teijin-Dupon) as a base film, dried at 100° C. for 30 minutes, and exposed to UV light at 1,000 mJ/cm$^2$ to form a coating layer having a thickness of 50 μm, which in turn was left at 80° C. for 24 hours.

A composition for adhesive layers was prepared by mixing 83.22 g of a (meth)acrylate resin (CI207, Soken, 30 wt % in terms of solid content), 0.03 g of a curing agent (TD75, Soken), 0.1 g of a silane coupling agent (A50, Soken), and 16.64 g of methylethylketone (Daejung Chemical Industry Co., Ltd.) as a diluent. Then, the composition for adhesive layers was deposited onto a release film (MRF38, Mitsubishi), and dried at 80° C. for 3 minutes to form an adhesive layer having a thickness of 25 μm, which in turn was left in an oven under constant temperature/humidity conditions of 30° C. and 75% RH for 48 hours. A film for displays was prepared by attaching the adhesive layer to the other surface of the PET film having the coating layer formed thereon.

Example 4

A composition for coating layers was prepared by mixing 88.16 g of an alicyclic epoxy functional group-containing silsesquioxane resin (Epoxy Hybrimer, 90 wt % in terms of solid content, Solips), 1.59 g of (4-tert-butylphenyl)diphenylsulfonium triflate (Aldrich) as a photocationic polymerization initiator, 6.15 g of methylethylketone as a diluent, and 4.10 g of a UV absorbent (Tinuvin 477). Then, the composition for coating layers was deposited onto one surface of a polyethylene terephthalate (PET) film (KEL86W, Teijin-Dupon) as a base film, dried at 100° C. for 30 minutes, and exposed to UV light at 1,000 mJ/cm$^2$ to form a coating layer having a thickness of 50 μm, which in turn was left at 80° C. for 24 hours.

A composition for adhesive layers was prepared by mixing 83.22 g of a (meth)acrylate resin (CI207, Soken, 30 wt % in terms of solid content), 0.03 g of a curing agent (TD75, Soken), 0.10 g of a silane coupling agent (A50, Soken), and 16.64 g of methylethylketone (Daejung Chemical Industry Co., Ltd.) as a diluent. Then, the composition for adhesive layers was deposited onto a release film (MRF38, Mitsubishi), and dried at 80° C. for 3 minutes to form an adhesive layer having a thickness of 25 μm, which in turn was left in an oven under constant temperature/humidity conditions of 30° C. and 75% RH for 48 hours. A film for displays was prepared by attaching the adhesive layer to the other surface of the PET film having the coating layer formed thereon.

Example 5

A composition for coating layers was prepared by mixing 88.16 g of an alicyclic epoxy functional group-containing silsesquioxane resin (Epoxy Hybrimer, 90 wt % in terms of solid content, Solips), 1.59 g of (4-tert-butylphenyl)diphenylsulfonium triflate (Aldrich) as a photocationic polymerization initiator, 6.15 g of methylethylketone as a diluent, and 4.10 g of a UV absorbent (Tinuvin 477). Then, the composition for coating layers was deposited onto one surface of a polyethylene terephthalate (PET) film (KEL86W, Teijin-Dupon) as a base film, dried at 100° C. for 30 minutes, and exposed to UV light at 1,000 mJ/cm$^2$ to form a coating layer having a thickness of 50 μm, which in turn was left at 80° C. for 24 hours.

A composition for adhesive layers was prepared by mixing 81.20 g of a (meth)acrylate resin (CI207, Soken, 30 wt % in terms of solid content), 0.03 g of a curing agent (TD75, Soken), 0.10 g of a silane coupling agent (A50, Soken), 2.44 g of a UV absorbent (Tinuvin 477), and 16.64 g of methylethylketone (Daejung Chemical Industry Co., Ltd.) as a diluent. Then, the composition for adhesive layers was deposited onto a release film (MRF38, Mitsubishi), and dried at 80° C. for 3 minutes to form an adhesive layer having a thickness of 25 μm, which in turn was left in an oven under constant temperature/humidity conditions of 30° C. and 75% RH for 48 hours. A film for displays was prepared by attaching the adhesive layer to the other surface of the PET film having the coating layer formed thereon.

Comparative Example 1

A film for displays was prepared by the same method as in Example 2 except that the UV absorbent (Tinuvin 477) was not used.

Comparative Example 2

A film for displays was prepared by the same method as in Example 2 except that Tinuvin 384-2 (absorbance: 0.17 AU at a wavelength of 380 nm in 20 mg/L of toluene (path 1 cm) and 0.031 AU at a wavelength of 390 nm in 20 mg/L of toluene (path 1 cm), maximum absorption wavelength: 350 nm) was used instead of Tinuvin 477 as a UV absorbent.

Comparative Example 3

A film for displays was prepared by the same method as in Example 3 except that Tinuvin 384-2 was used instead of Tinuvin 326 as a UV absorbent.

Comparative Example 4

A film for displays was prepared by the same method as in Example 1 except that 0.65 g of Tinuvin 326 was used instead of 2.08 g of Tinuvin 326 as a UV absorbent.

Comparative Example 5

A film for displays was prepared by the same method as in Example 1 except that 7.50 g of Tinuvin 326 was used instead of 2.08 g of Tinuvin 326 as a UV absorbent.

Components of each of the films for displays prepared in Examples and Comparative Examples are shown in Table 1 and Table 2. The films for displays prepared in Examples and Comparative Examples were evaluated as to the following properties and results are shown in Table 1 and Table 2.

(1) Transmittance depending upon wavelength: Transmittance of each of the films for displays at a wavelength of 300 nm to 800 nm was measured using a Lambda 1050 UV spectrometer (Perkin Elmer).

(2) Pencil hardness: Pencil hardness of the coating layer of each film for displays was measured using a pencil hardness tester (Heidon) in accordance with JIS K5400. Pencil hardness was measured using 6B to 9H pencils (Mitsubishi) under a load of 1 kg on the coating layer at a scratch angle of 45° and a scratch speed of 60 mm/min. When the coating layer had one or more scratches after being tested 5 times using a certain pencil, pencil hardness was measured again using another pencil having one-level lower pencil hardness than the previous pencil. A pencil hardness value allowing no scratch to be observed all five times was taken as pencil hardness of the film.

(3) Storage stability: Each film for displays was left under conditions of 25° C. and 50% RH for 1,000 hours. Precipitation of white spots on the adhesive layer or the coating layer was rated as X and no precipitation thereof was rated as ○.

TABLE 1

|  | Example 1 | Example 2 | Example 3 | Example 4 | Example 5 |
|---|---|---|---|---|---|
| UV absorbent containing layer | Adhesive layer | Adhesive layer | Coating layer | Coating layer | Adhesive layer and coating layer |
| Kind of UV absorbent | Tinuvin 326 | Tinuvin 477 | Tinuvin 326 | Tinuvin 477 | Tinuvin 477 |
| Amount of UV absorbent in adhesive layer (wt %, based on total solid content) | 7.83 | 13.24 | 0.00 | 0.00 | 9.06 |
| Amount of UV absorbent in coating layer (wt %, based on total solid content) | 0.00 | 0.00 | 4.82 | 4.82 | 4.82 |
| Transmittance at 380 nm (%) | 0.23 | 0.37 | 0.35 | 0.48 | 0.37 |
| Transmittance at 390 nm (%) | 0.30 | 0.44 | 0.42 | 0.54 | 0.44 |
| Pencil hardness of coating layer | 9 H | 9 H | 6 H | 6 H | 9 H |
| Storage reliability | ○ | ○ | ○ | ○ | ○ |

TABLE 2

|  | Comparative Example 1 | Comparative Example 2 | Comparative Example 3 | Comparative Example 4 | Comparative Example 5 |
|---|---|---|---|---|---|
| UV absorbent containing layer | No | Adhesive layer | Coating layer | Adhesive layer | Adhesive layer |
| Kind of UV absorbent | — | Tinuvin 384-2 | Tinuvin 384-2 | Tinuvin 326 | Tinuvin 326 |
| Amount of UV absorbent in adhesive layer (wt %, based on total solid content) | 0.00 | 13.24 | 0.00 | 2.59 | 23.45 |
| Amount of UV absorbent in coating layer (wt %, based on total solid content) | 0.00 | 0.00 | 4.82 | 0.00 | 0.00 |
| Transmittance at 380 nm (%) | 82.50 | 0.45 | 0.89 | 0.60 | 0.30 |
| Transmittance at 390 nm (%) | 87.60 | 23.50 | 29.76 | 4.86 | 0.31 |
| Pencil hardness of coating layer | 9 H | 9 H | 5 H | 9 H | 9 H |
| Storage reliability | ○ | ○ | ○ | ○ | X |

As shown in Tables 1 and 2, the films for displays according to the present invention had a transmittance of 1% or less at a wavelength of 380 nm to 390 nm, thereby securing high external light stability with respect to a display device while providing good long-term reliability.

It should be understood that various modifications, changes, alterations, and equivalent embodiments can be made by those skilled in the art without departing from the spirit and scope of the invention.

The invention claimed is:

1. A window film for displays, comprising: a base layer; a coating layer directly formed on one surface of the base layer and having a pencil hardness of about 6H or higher; and an adhesive layer formed on the other surface of the base layer,
    wherein the base layer is made of an optically transparent material and has a thickness of about 10 μm to about 200 μm,
    wherein at least one of the coating layer and the adhesive layer comprises about 3 wt % to about 20 wt % of a UV absorbent in each layer,
    wherein the coating layer has a thickness of about 20 μm to about 100 μm and is formed of a composition comprising a silicone resin having a crosslinkable functional group, and
    wherein the window film has a transmittance of about 1% or less at a wavelength of 380 nm and a transmittance of about 1% or less at a wavelength of 390 nm.

2. The window film for displays according to claim 1, wherein the UV absorbent has an absorbance of about 0.25 AU or more at a wavelength of 380 nm in 20 mg/L of toluene.

3. The window film for displays according to claim 1, wherein the UV absorbent comprises at least one of a benzotriazole UV absorbent and a triazine UV absorbent.

4. The window film for displays according to claim 1, wherein the crosslinkable functional group comprises an alicyclic epoxy group.

5. The window film for displays according to claim 1, wherein the adhesive layer is formed of a composition comprising a (meth)acrylic adhesive resin and a curing agent.

6. The window film for displays according to claim 1, wherein the coating layer comprises about 3 wt % to about 20 wt % of the UV absorbent.

7. The window film for displays according to claim 1, wherein the adhesive layer comprises about 3 wt % to about 20 wt % of the UV absorbent.

8. A display comprising the window film for displays according to claim 1.

9. A window film for displays, comprising: a base layer; an adhesive layer formed on the base layer; and a coating layer formed on the adhesive layer and having a pencil hardness of about 6H or higher, wherein at least one of the coating layer and the adhesive layer comprises about 3 wt % to about 20 wt % of a UV absorbent in each layer, wherein the base layer is made of an optically transparent material and has a thickness of about 10 μm to about 200 μm, wherein the coating layer has a thickness of about 20 μm to about 100 μm and is formed of a composition comprising a silicone resin having a crosslinkable functional group, and wherein the window film has a transmittance of about 1% or less at a wavelength of 380 nm and a transmittance of about 1% or less at a wavelength of 390 nm.

10. The window film for displays according to claim 9, wherein the UV absorbent has an absorbance of about 0.25 AU or more at a wavelength of 380 nm in 20 mg/L of toluene.

11. A display comprising the window film for displays according to claim 9.

12. The window film for displays according to claim 9, wherein the coating layer comprises about 3 wt % to about 20 wt % of the UV absorbent.

13. The window film for displays according to claim 9, wherein the adhesive layer comprises about 3 wt % to about 20 wt % of the UV absorbent.

\* \* \* \* \*